United States Patent [19]

Rogers, Sr.

[11] 4,334,724
[45] Jun. 15, 1982

[54] CABINET FOR A KITCHEN BLENDER, MIXER, GRINDER, ET AL

[76] Inventor: Henry F. Rogers, Sr., 9707 Cinamon Creek Dr., Vienna, Va. 22180

[21] Appl. No.: 83,161

[22] Filed: Oct. 9, 1979

[51] Int. Cl.³ .................... A47B 81/02; A47F 7/00
[52] U.S. Cl. ........................... 312/280; 312/237; 312/245; 312/290; 206/45.17; 206/349; 206/373; 211/60 T; 211/87
[58] Field of Search ............ 312/280, 237, 206, 207, 312/208, 236, 351, 328, 290, DIG. 33, 292, 245; 206/373, 349, 45, 45.14, 45.17, 45.19, 45.31, 320, 379; 211/60 T, 69, 88, 87

[56] References Cited

U.S. PATENT DOCUMENTS

| | | | |
|---|---|---|---|
| 53,260 | 3/1866 | Billings | 312/237 |
| D. 168,746 | 2/1953 | Laciura | 211/88 |
| 512,101 | 1/1894 | Eastes | 312/209 |
| 1,045,395 | 11/1912 | Grogan | 312/280 |
| 1,216,442 | 2/1917 | Haley | 312/351 |
| 1,271,641 | 7/1918 | Werwath | 312/209 |
| 1,457,361 | 6/1923 | Gilbert | 206/45.19 |
| 1,703,859 | 3/1929 | Bauman et al. | 312/245 |
| 1,717,217 | 6/1929 | Izan | 312/280 |
| 1,755,295 | 4/1930 | Hellman | 206/45.17 |
| 1,758,238 | 5/1930 | Peterson | 312/245 |
| 1,858,146 | 5/1932 | Ferguson | 312/209 |
| 1,900,793 | 3/1933 | Broughton | 312/237 |
| 1,916,994 | 7/1933 | Siegrist | 206/45.31 |
| 2,459,460 | 1/1949 | Segal | 206/349 |
| 2,520,380 | 8/1950 | Wegman | 312/290 |
| 2,542,162 | 2/1951 | Sutton | 312/328 |
| 2,551,305 | 5/1951 | Tompkins | 312/245 |
| 2,608,294 | 8/1952 | Ward | 312/206 |
| 2,634,189 | 4/1953 | Hill | 312/237 |
| 2,642,331 | 6/1953 | Sprinkle | 312/206 |
| 2,649,191 | 8/1953 | McLaughlin | 206/373 |
| 2,661,258 | 12/1953 | Dinken | 312/280 |
| 2,795,325 | 6/1957 | Smith | 206/349 |
| 2,829,778 | 4/1958 | Carabet | 206/373 |
| 2,841,289 | 7/1958 | Odlum et al. | 211/87 |
| 3,182,420 | 5/1965 | Bender | 206/45.14 |
| 3,486,610 | 12/1969 | Hain et al. | 312/245 |
| 3,524,690 | 8/1970 | Gurney | 312/245 |
| 3,758,183 | 9/1973 | Steinkamp et al. | 312/245 |
| 3,848,737 | 11/1974 | Kenon | 312/290 |
| 3,940,196 | 2/1976 | Ketchel | 312/237 |
| 3,987,895 | 10/1976 | Jamshidi | 206/349 |
| 4,170,392 | 10/1979 | Spevak | 206/373 |

FOREIGN PATENT DOCUMENTS 807047  1/1959  United Kingdom ............... 312/290

*Primary Examiner*—Victor N. Sakran
*Attorney, Agent, or Firm*—Diller, Ramik & Wight

[57] ABSTRACT

A cabinet for a kitchen appliance and its components such as "The Oster Kitchen Center" which is utilized as a blender, mixer, grinder, slicer, shredder, et al, including a bottom wall, a pair of spaced upstanding side walls and rear wall, an intermediate wall disposed above the bottom wall, a pair of projections on the rear wall contoured for locating a mixer arm in supported relationship upon the bottom wall, a slot in the intermediate wall for locating a grinder in supported relationship upon the bottom wall, apertures in the intermediate wall for locating and supporting beaters, and a pair of recesses for locating a blender container and a cutter unit upon the intermediate wall.

30 Claims, 9 Drawing Figures

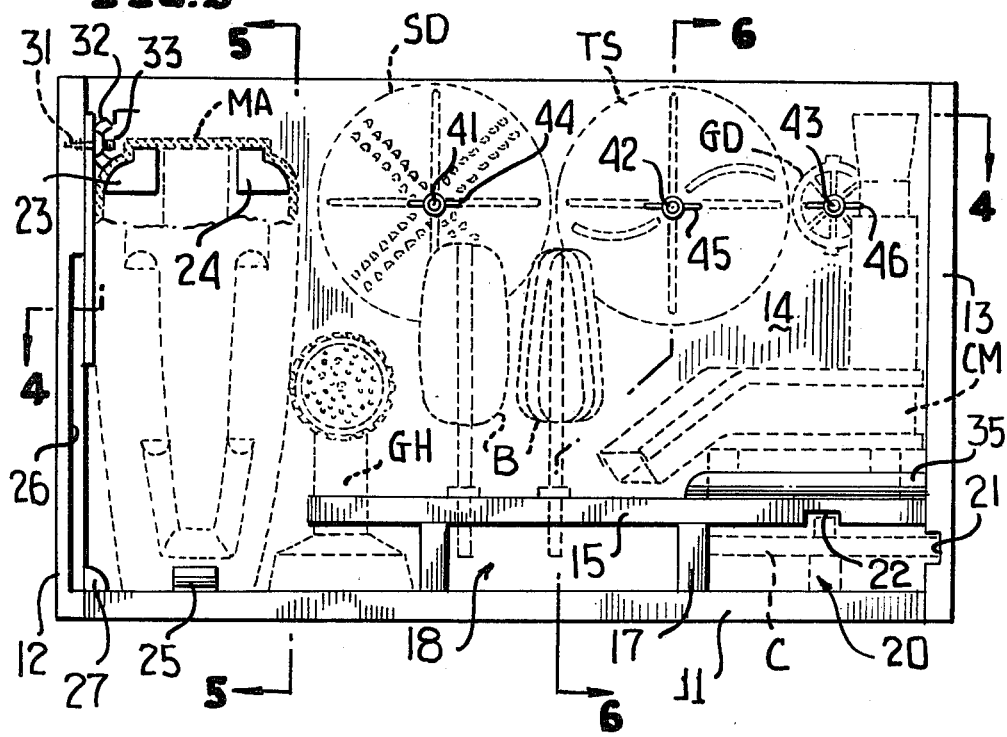
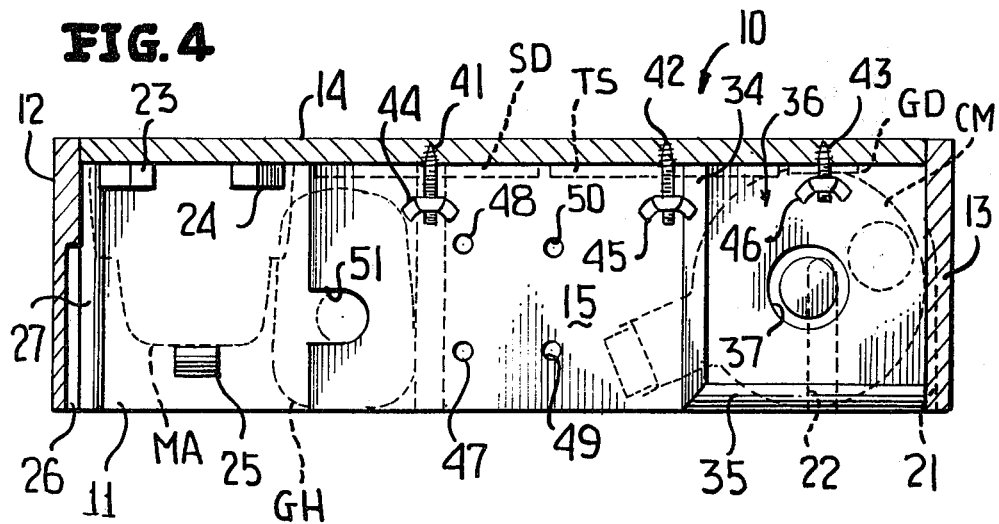

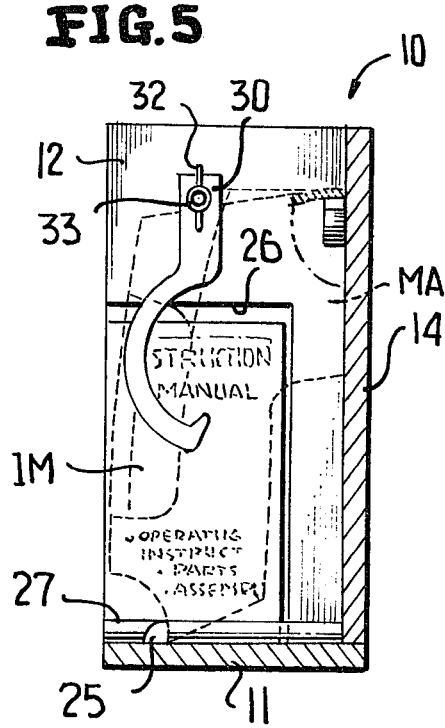
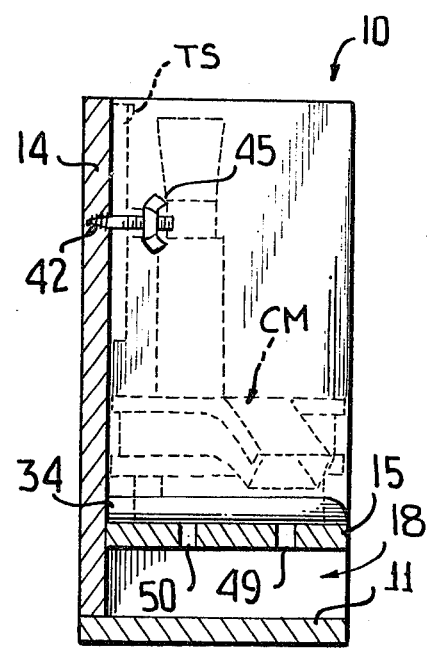
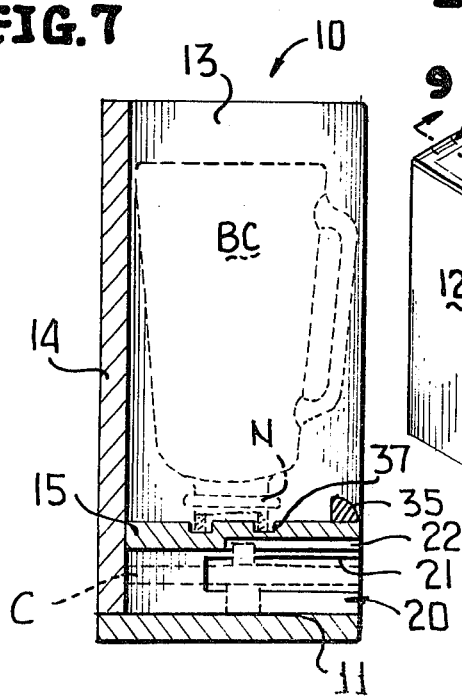
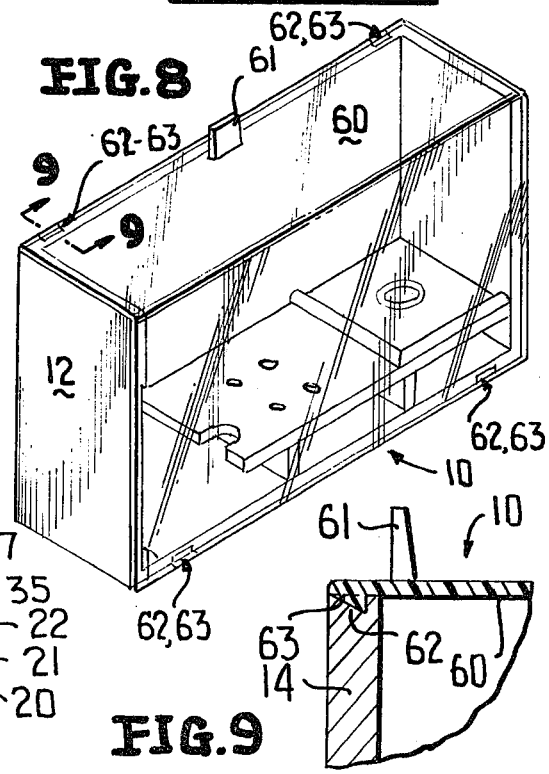
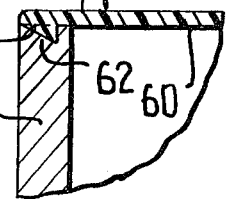

CABINET FOR A KITCHEN BLENDER, MIXER, GRINDER, ET AL

This invention is directed to a novel cabinet for kitchen appliance components and particularly for "The Oster Kitchen Center" which is a single compact appliance which utilizes a powered motor base to which may be selectively attached a blender container, a mixer arm and associated beaters or dough hooks, a grinder, a slicer/shredder/salad maker/french fry cutter, etc. Obviously, when the latter-noted or an equivalent appliance is being utilized as a blender, the mixer, grinder/slicer and other components are not utilized or associated with the motor base and, thus, must be stored in a convenient area. Obviously, standard kitchen cabinets are utilized at present for such purposes, but in keeping with the present invention a portable cabinet is provided which houses all of the kitchen appliance components in an efficient and readily available manner with a total ease of accessibility and extremely high esthetic qualities.

In keeping with the foregoing, the cabinet of the present invention though designed specifically for "THE OSTER KITCHEN CENTER" is equally applicable for use with other types of kitchen appliances and/or components thereof and includes a bottom wall, a pair of side walls, a rear wall, and an intermediate wall above the bottom wall, and all of the walls being cooperative for locating and/or securing upon or relative thereto such components as a mixer arm, a grinder or grinder head, a cutter unit, a blender container, cutting discs, beaters, dough hooks, an instruction book, etc.

A further object of this invention is to provide a novel cabinet of the type aforesaid wherein locating means for the mixer arm are in the form of a pair of projections projecting outwardly of the rear wall and having peripheral portions contoured to the interior profile of a portion of the mixer arm.

Another object of this invention is to provide a cabinet of the type aforesaid wherein the bottom wall also includes a projection for locating a mixer arm relative thereto, and the intermediate wall includes slot means for locating a grinder head, aperture means for locating beaters or dough hooks, and locating means in the form of recesses for locating a blender and/or a slicer/shredder/cutter et al.

Still another object of this invention is to provide a novel cabinet of the type aforesaid wherein means are provided in the form of a slot in a side wall of the cabinet for receiving an instruction book therein while a wrench for the appliance is disposed in supporting overlying relationship to the recess for retaining the instruction book in its seated position.

With the above and other objects in view that will hereinafter appear, the nature of the invention will be more clearly understood by reference to the following detailed description, the appended claims and the several views illustrated in the accompanying drawings.

IN THE DRAWINGS

FIG. 3 is a front view of the cabinet of FIGS. 1 and 2 and illustrates in phantom outline various components of the appliance, such as a mixer arm, cutters, a grinder, a slicer et al located and supported relative to the cabinet.

FIG. 4 is a sectional view taken generally along line 4—4 of FIG. 3, and illustrates further details of the cabinet including screws and associated wing nuts for retaining cutters upon the rear wall.

FIG. 5 is a sectional view taken generally along line 5—5 of FIG. 3, and illustrates the manner in which the instruction book is held in a recess of an associated side wall by a wrench of the appliance.

FIG. 6 is a sectional view taken generally along line 6—6 of FIG. 3, and illustrates the manner in which a slicer/shredder/salad maker/french fry cutter is located upon and supported by the intermediate wall.

FIG. 7 is a sectional view taken generally along line 7—7 of FIG. 1, and illustrates the manner in which a blender container is located within an annular recess of the intermediate wall.

FIG. 8 is a perspective view similar to FIG. 1, though of reduced size, and illustrates a modification of the cabinet which includes a dust cover snap-secured thereto.

FIG. 9 is an enlarged fragmentary sectional view taken generally along line 9—9 of FIG. 8, and illustrates one of four snap fasteners of the dust cover located in the notch of the cabinet rear wall.

Figure 1:
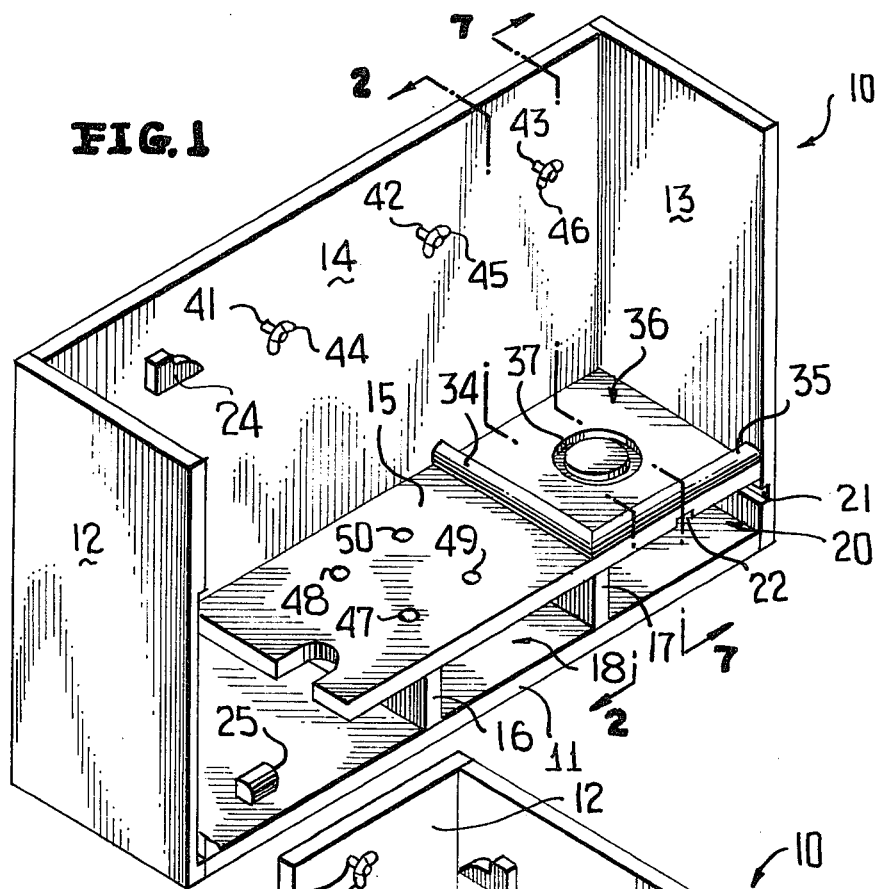
FIG. 1 is a perspective view of a novel cabinet for a kitchen appliance components constructed in accordance with this invention, and illustrates a bottom wall, a pair of spaced upstanding side walls, a rear wall, an intermediate wall, and a variety of cooperative means for locating components of the appliance relative to the cabinet.

A novel cabinet for kitchen appliance components is generally designated by the reference numeral 10 and includes a bottom wall 11 of a generally rectangular configuration, a pair of spaced upstanding generally rectangular side walls 12, 13, a generally rectangular rear wall 14, and an intermediate wall 15 disposed above and generally parallel to the bottom wall 11. The intermediate wall 15 is spaced above the bottom wall 11 by a pair of generally vertical spacer walls 16, 17 which define with portions of the intermediate wall 15 and the bottom wall 11 a pair of compartments 18, 20, the latter of which includes a horizontal slot 21 (FIG. 3) formed in the side wall 13 and a downwardly opening slot 22 formed in an under surface (unnumbered) of the intermediate wall 15. The slots 21 and/or 22 define means for locating in conjunction with the associated walls 11, 17, 15 and 13 one of a plurality of cutters or cutter discs C which in the illustrated embodiment of the invention is a french fry cutter C which is utilized with a cutter mechanism CM (FIGS. 3, 4 and 6) which will be described more fully hereinafter.

Figure 2:
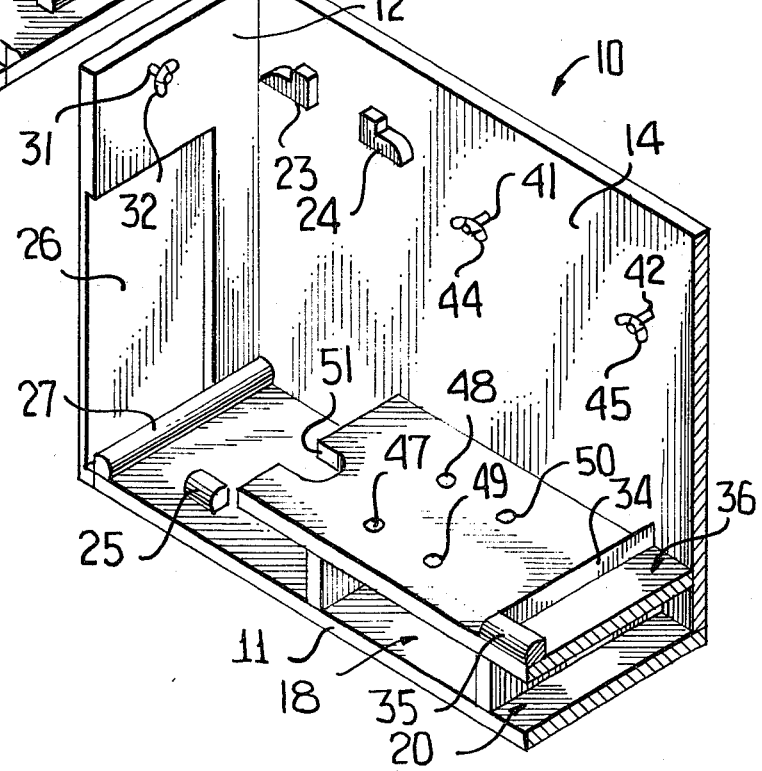
FIG. 2 is a partial perspective view taken along line 2—2 of FIG. 1, and illustrates further details of the the cabinet including a recess for receiving an instruction booklet and projections carried by the rear wall for locating a mixer arm relative thereto.

The rear wall 14 includes a pair of contoured projections 23, 24 (FIGS. 1 through 3) which are contoured to the interior profile of a mixer arm MA, as is best illustrated in FIG. 3, for locating or positioning the mixer arm MA relative to the rear wall 14 in supporting relationship to and upon the bottom wall 11. Another upwardly directed projection 25 is carried by the bottom wall 11 for further locating the mixer arm MA.

The side wall 12 further includes means in the form of a generally rectangular slot 26 and a ledge 27 within which is received an instruction manual or instruction booklet IM (FIG. 5) which relates to the care, use, operation, etc. of the overall kitchen appliance, as well as the various components thereof. A tool or wrench 30 of the overall kitchen appliance having an opening 31 (FIG. 3) is supported in overlying relationship to the slot or recess 26 and is held in the position best illustrated in FIG. 5 by a wing nut 32 threaded upon a screw 33 which is in turn threaded in the side wall 12. In this manner, the instruction manual IM can be retained in the slot 26, the wrench 30 can be supported upon the threaded screw 33 by the wing nut 32, and the wrench 30 in turn retains the instruction manual IM within the recess 26 and precludes the same from being inadvertently or accidentally dislodged therefrom.

The cutting mechanism or cutting unit CM is seated within a generally rectangular area defined by portions of the side walls 13, 14 and two upstanding ledges or ribs 34, 35. Disposed centrally within the area or recess 36 defined by portions of the walls 13, 14 and the ridges or ribs 34, 35 is an upwardly opening annular groove or recess 37 which receives the neck N (7) of a blender container BC when, of course, the cutter mechanism or cutter unit CM is not housed within the recess 36. In other words, the blender container BC is seated with its neck N within the annular upwardly opening recess or groove 37 in the manner shown in FIG. 7 only when the cutter mechanism or cutter unit CM is not housed within the recess 36, as shown in FIGS. 3, 4 and 6 of the drawings.

The rear wall 14 is provided with three additional screws 41 through 43 carrying on threaded end portions (unnumbered) thereof threaded wing nuts 44 through 46, respectively. The screws 41 through 43 support thereon a respective shredder disc SD, a thick and/or thin slicer TS or both, and one or more meat grinder discs GD.

The intermediate wall 15 includes a plurality of means in the form of bores or openings for receiving stems (unnumbered) of round or square beaters, or round or square dough hooks, which are generally designated by the reference numeral B in FIG. 3.

To the left of the apertures or bores 47, 48 is means in the form of a laterally opening slot 51 which embraces and thereby locates a grinder head GH relative to the intermediate wall 15 in supporting relationship upon the bottom wall 11.

Reference is made to FIGS. 8 and 9 which illustrates a transparent plastic dust cover 60 having a handle 61 and a locking tab 62 at each of four corners thereof for engaging in latching notches 63 of the rear wall 14 and the bottom wall 11 in the manner most readily apparent from FIG. 9. With all of the components positioned within the cabinet 10 in the manner best illustrated in FIGS. 1 through 7, the dust cover 60 assures that the various components remain relatively dust free and, of course, their presence and/or absence and location is readily verified due to the transparent nature of the cover 60.

Although only a preferred embodiment of the invention has been specifically illustrated and described herein, it is to be understood that minor variations may be made in the apparatus without departing from the spirit and scope of the invention, as defined in the appended claims.

I claim:

1. A cabinet for kitchen appliance components comprising a bottom wall, a pair of spaced upstanding sidewalls and a rear wall, an intermediate wall disposed above said bottom wall, means on said rear wall for locating a powered mixer arm in supported relationship upon said bottom wall, means on said intermediate wall for locating a grinder in supported relationship upon said bottom wall, means on said intermediate wall for locating a cutter unit on said intermediate wall, means for locating a blender container upon said intermediate wall, means for supporting a plurality of cutting discs upon said rear wall, means for supporting a plurality of beaters relative to said intermediate wall, and means for supporting an instruction book against one of said side walls.

2. The cabinet as defined in claim 1 including further means disposed on said bottom wall for locating the powered mixer arm relative thereto.

3. The cabinet as defined in claim 1 including means defined at least in part by said bottom and intermediate walls for housing a cutting disc.

4. The cabinet as defined in claim 1 wherein said blender container locating means is disposed within said cutter unit locating means.

5. The cabinet as defined in claim 1 wherein said mixer arm locating means is a projection projecting outwardly of said rear wall and having a peripheral portion contoured to the interior profile of a portion of the powered mixer arm.

6. The cabinet as defined in claim 1 wherein said intermediate wall includes a free edge spaced from one of said side walls, and said grinder locating means is a slot in said intermediate wall opening outwardly through said free edge.

7. The cabinet as defined in claim 1 wherein said instruction book supporting means includes a recess in one of said sidewalls for receiving an instruction book therein in standing-on-edge relationship, and means for supporting a wrench of the appliance in overlying relationship to said recess for retaining the instruction book therein.

8. The cabinet as defined in claim 1 wherein said blender container locating means is an upwardly opening annular channel.

9. The cabinet as defined in claim 1 wherein said cutter unit locating means is an upwardly projecting ledge transversely spanning said intermediate wall.

10. A cabinet for kitchen appliance components comprising a bottom wall, a pair of spaced upstanding side walls and a rear wall, cooperative locating means on said rear wall and said bottom wall for locating a powered mixer arm in supported relationship upon said bottom wall, said cooperative locating means including first locating means carried by said bottom wall for abuttingly contacting a lower end portion of the mixer arm adapted to rest upon said bottom wall, and said cooperative locating means further including at least a single projection projecting outwardly of said rear wall and having a peripheral portion contoured to the interior profile of an upper portion of the mixer arm disposed contiguous said rear wall.

11. The cabinet as defined in claim 10 wherein said cooperative locating means includes a further projection projecting outwardly of said rear wall and having a peripheral portion contoured to the interior profile of an upper portion of the mixer arm disposed contiguous said rear wall.

12. The cabinet as defined in claim 10 including an intermediate wall disposed above said bottom wall, means on said intermediate wall for locating a grinder in supported relationship upon said bottom wall, and said grinder locating means being a slot opening outwardly through a transverse terminal edge of said intermediate wall spaced from one of said side walls.

13. The cabinet as defined in claim 10 including an intermediate wall disposed above said bottom wall, and a plurality of aperture means in said intermediate wall for supportingly receiving therein shafts of a plurality of beaters.

14. The cabinet as defined in claim 10 including an intermediate wall disposed above said bottom wall, means on said intermediate wall for locating a cutter unit thereon, and means within said last-mentioned means for locating a blender container upon said intermediate wall.

15. The cabinet as defined in claim 10 including an intermediate wall disposed above said bottom wall, means on said intermediate wall for locating a cutter unit thereon, means within said last-mentioned means for locating a blender container upon said intermediate wall, said cutter unit locating means being an upwardly projecting ledge at least in part bounding a lower end portion of the cutter unit resting upon said intermediate wall, and said blender container locating means being an upwardly opening annular recess adapted to receive therein a lower peripheral edge portion of the blender container.

16. The cabinet as defined in claim 10 including a recess in one of said side walls for receiving therein an instruction book resting on edge upon said bottom wall, and means for supporting a wrench for the appliance in overlying relationship to said recess thereby retaining an instruction book within said recess.

17. The cabinet as defined in claim 10 including a plurality of means projecting from said rear wall for supporting cutter discs thereon.

18. The cabinet as defined in claim 12 including a plurality of aperture means in said intermediate wall for supportingly receiving therein shafts of a plurality of beaters.

19. The cabinet as defined in claim 12 including means on said intermediate wall in the form of an upwardly projecting ledge for locating a cutter unit on the intermediate wall by at least in part partially bounding a lower end portion of the cutter unit, and an upwardly opening annular recess within said ledge adapted to receive therein a lower peripheral edge portion of a blender container.

20. The cabinet as defined in claim 18 including means on said intermediate wall in the form of an upwardly projecting ledge for locating a cutter unit on the intermediate wall by at least in part partially bounding a lower end portion of the cutter unit, and an upwardly opening annular recess within said ledge adapted to receive therein a lower peripheral edge portion of a blender container.

21. The cabinet as defined in claim 1 wherein said mixer arm locating means is a pair of generally mirror image projections projecting outwardly of said rear wall and each having a peripheral portion contoured to the interior profile of portions of the mixer arm.

22. The cabinet as defined in claim 1 wherein said mixer arm locating means is a projection projecting outwardly of said rear wall and having a peripheral portion contoured to the interior profile of a portion of the mixer arm, and further means disposed on said bottom wall for locating a mixer arm relative thereto, said last-mentioned mixer arm locating means being a projection projecting upwardly of said bottom wall and being adapted for contacting an exterior surface of the mixer arm.

23. The cabinet as defined in claim 1 wherein said intermediate wall includes a free edge spaced from one of said sidewalls, said grinder locating means being a slot in said intermediate wall opening outwardly through said free edge towards said one sidewall, said instruction book supporting means including a recess in said one sidewall for receiving an instruction book therein in standing-on-edge relationship, and means for supporting a wrench of the appliance in overlying relationship to said recess for retaining the instruction book therein.

24. The cabinet as defined in claim 1 wherein said blender container locating means is an upwardly opening annular channel formed in said intermediate wall, and said cutter unit locating means is an upwardly projecting ledge carried by said intermediate wall transversely spanning said intermediate wall.

25. The cabinet as defined in claim 1 including means defined at least in part by said bottom and intermediate wall housing a cutting disc, said last-mentioned means defining a chamber for receiving a cutting disc, said chamber being in part defined by a lowermost surface of said intermediate wall and an inner surface of an adjacent one of said side walls, and a groove in each of said lowermost surface and said inner surface of said intermediate wall and said one adjacent side wall, respectively, opening in a direction toward said bottom wall, toward said opposite side wall, respectively, and outwardly of said cabinet for receiving therein a portion of an associated cutting disc.

26. The cabinet as defined in claim 1 including further means disposed on said bottom wall for locating a mixer arm relative thereto, means defined at least in part by said bottom and intermediate walls for housing a cutting disc, said blender container locating means being disposed within said cutter unit locating means, said powered mixer arm locating means being a projection projecting outwardly of said rear wall and having a peripheral portion contoured to the interior profile of a portion of the powered mixer arm, said intermediate wall including a free edge spaced from one of said sidewalls, said grinder locating means being a slot in said intermediate wall opening outwardly through said free edge, said instruction book supporting means including a recess in one of said sidewalls for receiving an instruction book therein in standing-on-edge relationship, means for supporting a wrench of the appliance in overlying relationship to said recess for retaining the instruction book therein, said blender container locating means being an upwardly opening annular channel, and said cutter unit locating means being an upwardly projecting ledge transversely spanning said intermediate wall.

27. A cabinet for kitchen appliance components comprising a bottom wall, a pair of spaced upstanding sidewalls and a rear wall, an intermediate wall disposed above said bottom wall, said intermediate wall including a free edge spaced from one of said sidewalls, means for supporting an instruction book against said one side of the wall, said instruction book supporting means including a recess in said one sidewall opening in a direction towards said intermediate wall free edge and outwardly of said cabinet in a direction away from said rear wall, said instruction book supporting recess being adapted to receive therein an instruction book in standing-on-edge relationship, and means for supporting a wrench of an associated appliance in overlying relationship to said recess for retaining the instruction book therein.

28. The cabinet as defined in claim 27 including a ledge along said bottom wall adjacent said instruction book supporting recess and defining with the latter an upwardly opening channel adapted to receive a lower edge of an associated instruction book.

29. A cabinet for kitchen appliance components comprising a bottom wall, a pair of spaced upstanding sidewalls and a rear wall, an intermediate wall disposed above said bottom wall, means on said rear wall for locating a powered mixer arm in supported relationship upon said bottom wall, said intermediate wall including a free edge spaced from one of said sidewalls, means for supporting an instruction book against said one sidewall, said instruction book supporting means including a recess in said one sidewall for receiving an instruction book therein in standing-on-edge relationship, means for supporting a wrench of the appliance in overlying relationship to said recess for retaining the instruction book therein, said powered mixer arm locating means being a projection projecting outwardly of said rear wall, and said projection having a peripheral portion contoured to the interior profile of a portion of the mixer arm.

30. The cabinet as defined in claim 29 including means on said intermediate wall for locating a grinder in supported relationship upon said bottom wall, and said grinder locating means being a slot in said intermediate wall opening outwardly through said free edge in a direction towards said one sidewall.

* * * * *